United States Patent [19]

Vaill et al.

[11] 4,229,259
[45] Oct. 21, 1980

[54] GRID SLEEVE BULGE TOOL

[75] Inventors: Ronald E. Vaill, Penn Township, Westmoreland County; William D. Phillips, Pittsburgh, both of Pa.

[73] Assignee: Westinghouse Electric Corp., Pittsburgh, Pa.

[21] Appl. No.: 950,206

[22] Filed: Oct. 10, 1978

Related U.S. Application Data

[62] Division of Ser. No. 831,459, Sep. 8, 1977, Pat. No. 4,182,152.

[51] Int. Cl.² .............................................. G21C 21/08
[52] U.S. Cl. ...................................... 176/78; 29/523; 29/723
[58] Field of Search ............... 176/76, 78, 87; 29/234, 29/523, 723, 761; 72/370, 393, 398, 399

[56] References Cited

U.S. PATENT DOCUMENTS

| | | | |
|---|---|---|---|
| 1,048,584 | 12/1912 | Rich | 72/393 |
| 2,430,554 | 11/1947 | Bogg et al. | 72/393 |
| 3,345,730 | 10/1967 | Laverty | 29/523 |
| 3,459,028 | 8/1969 | Bluvoet | 72/393 |
| 3,791,466 | 2/1974 | Patterson et al. | 176/78 |
| 3,828,868 | 8/1974 | Jabsen | 176/76 X |
| 3,887,980 | 6/1975 | Yates et al. | 29/723 |
| 3,892,027 | 7/1975 | Jabsen | 29/723 |
| 4,135,972 | 1/1979 | Anthony | 176/78 |
| 4,139,315 | 2/1979 | Lëvy et al. | 176/78 |

*Primary Examiner*—Peter A. Nelson
*Attorney, Agent, or Firm*—J. R. Campbell

[57] ABSTRACT

An improved grid sleeve bulge tool designed for securing control rod guide tubes to sleeves brazed in a fuel assembly grid. The tool includes a cylinder having an outer diameter less than the internal diameter of the control rod guide tubes. The walls of the cylinder are cut in an axial direction along its length to provide several flexible tines or ligaments. These tines are similar to a fork except they are spaced in a circumferential direction. The end of each alternate tine is equipped with a semispherical projection which extends radially outwardly from the tine surface. A ram or plunger of generally cylindrical configuration and about the same length as the cylinder is designed to fit in and move axially of the cylinder and thereby force the tined projections outwardly when the ram is pulled into the cylinder. The ram surface includes axially extending grooves and plane surfaces which are complimentary to the inner surfaces formed on the tines on the cylinder. As the cylinder is inserted into a control rod guide tube, and the projections on the cylinder placed in a position just below or above a grid strap, the ram is pulled into the cylinder, thus moving the tines and the projections thereon outwardly into contact with the sleeve, to plastically deform both the sleeve and the control rod guide tube, and thereby form four bulges which extend outwardly from the sleeve surface and beyond the outer periphery of the grid peripheral strap. This process is then repeated at the points above the grid to also provide for outwardly projecting surfaces, the result being that the grid is accurately positioned on and mechanically secured to the control rod guide tubes which extend the length of a fuel assembly.

3 Claims, 8 Drawing Figures

GRID SLEEVE BULGE TOOL

This is a division of Ser. No. 831,459, filed Sept. 8, 1977, now U.S. Pat. No. 4,182,152.

BACKGROUND OF THE INVENTION

The invention described herein relates to nuclear reactor fuel assemblies, and more particularly to an improved design of bulge tool used for securing a grid to control rod guide tubes which extend the length of a fuel assembly.

A nuclear reactor fuel assembly includes top and bottom support members, having a multiplicity of fuel rods and control rod guide tubes supported therebetween. Each fuel rod and control rod guide tube is separately held against lateral displacement by grids of egg crate configuration which are spaced along the fuel assembly length. Since the fuel rods and control guide tubes are made of Zircaloy and the grid used for supporting these components in spaced relationship with each other are made of Inconel, the incompatibility of these materials in a reactor requires that the grids be held in an exact position along with fuel assembly length by mechanical means, rather than brazing, welding or some other arrangement.

In one well-known grid design, short sleeves which correspond to the number of control rod guide tubes in the fuel assembly, are brazed at appropriate points in the cells formed by the interleaved grid straps. Each sleeve projects about 2 inches beyond each side of the grid. During assembly of a fuel assembly, the grids are mounted in predetermined positions and after the control rod guide tubes are pulled through the grid sleeves, a bulging tool is moved into the control rod guide tube and stopped at a point just below a grid strap, but still inside a sleeve which extends through a grid cell. The tool is then actuated to cause projections on the tool to plastically deform the control rod guide tube and sleeve. The bulging tool is then moved to a point just above the grid, and the process of plastically deforming the material again repeated with the result being that the grid is mechanically locked and rigidly secured to the control rod guide tubes in the fuel assembly.

The bulge tool of the prior art consists of a hollow cylinder having an outer diameter less than the inner diameter of a guide tube into which it was adapted to be inserted. The cylinder has four slots cut along its axial length, which forms four tines or ligaments. The wall at the outer end of each time was made of a greater thickness than the remainder of the tine length, and a circular opening was formed therein to accommodate a ball bearing ball. Since the wall of each tine was not sufficiently thick to capture the ball and hold it in place, the ball was placed manually in each tine just prior to placing the tool into use. A tapered ram or plunger was then inserted in the cylinder so that as the ram was forced toward the open end of the tines, the tapered surface engaged the balls and forced them radially outward into contact with the guide tube to produce spherical bulges in the sleeve and the control rod guide tube positioned therein.

The primary disadvantage of this design of tool is that the inner diameter of the tines or ligaments was held at a fixed diameter by the cylindrical surfaces on the ram. This fixed diameter was set in an effort to prevent the inner diameter of the guide tube, between bulges, from shrinking below an acceptable and preestablished limit. The reduction of circumferential length of the bulge also allowed a much larger inner diameter shrink-in due to the reduced chord diameter. This reduced chord diameter resulted from a drawing in or a contraction of the guide tube material appearing between adjacent bulges, and this action occurred at the time of making the bulges and the guide tube.

Another and perhaps more precise reason for such contraction or drawing in of the guide tube material between bulges, is that the slots or spaces between the tines on the cylinder, increased in size during the time bulges were being made. This increased space between tines provided an unsupported section of guide tube which allowed the material to distort to a flat shape rather than retaining its cylindrical configuration. It is apparent that the support in this area is very critical, because if the inner diameter shrinks or contracts to a distance less than the outer diameter of a control rod, it will be obvious that the control rod will not freely be movable in the control rod guide tube during the time of reactor operation.

Also, the design is such that the balls remained stationary while the tapered ram moved linearly into engagement therewith and thus forced them outwardly to create the bulge. This moving contact between the tapered ram and the balls produces very high hertz stresses at the point of contact between the ball bearing balls and the tapered ram. These high stresses, combined with the sliding action of the ram, tended to gouge the ram's surface which not only detracted from its efficiency but also placed a severe limit on its useful life.

SUMMARY OF THE INVENTION

Briefly stated, the above disadvantages of the prior art are eliminated by providing a bulge tool which includes a cylinder having axially extending tines or ligaments formed by slots cut in the cylinder walls. Projections integrally formed on the outer surface of the tines and near the end of the cylinder, move outwardly under the influence of an internally operating ram to form bulges by plastically deforming the material in a sleeve and control rod guide tube, and thus effect securing a grid to control rod guide tubes in a fuel assembly. As the material is deformed by the action of a ram riding on complementary surfaces formed on the tine's inner surfaces, the inner diameter of the guide tube is held to a predetermined minimum by the coacting effect of other tines, located between the tines having projections, and ram surfaces during the time of deforming the guide tubes.

BRIEF DESCRIPTION OF THE DRAWINGS

While the specification concludes with the claims particularly pointing out and distinctly claiming the subject matter of the invention, it is believed the invention will be better understood from the following description taken in connection with the accompanying drawings wherein:

DESCRIPTION OF THE PREFERRED EMBODIMENT

A typical fuel assembly used in nuclear reactors consists of multiple fuel rods held in parallel spaced relation with each other by top and bottom support members and by grids of egg-crate configuration located along the fuel rod length. Certain of the cells in each grid also include a short, thin-walled sleeve brazed or otherwise affixed to the grid straps. Control rod guide tubes, each of which accommodates movement of control rods therein, extend through the sleeves brazed to the grid. According to current practice, when the material of the grid and fuel rods are different, e.g. Inconel and Zircaloy, the grid sleeve, and therefore the grid, is mechanically attached to the control rod guide tubes by a bulging technique which includes plastically deforming each control rod guide tube and sleeve on opposite sides of the grid. This action effectively locks the grid on the control rod guide tubes and precludes its displacement on the guide tubes when the grid is subjected to hydraulic forces during reactor operation.

Figure 1:
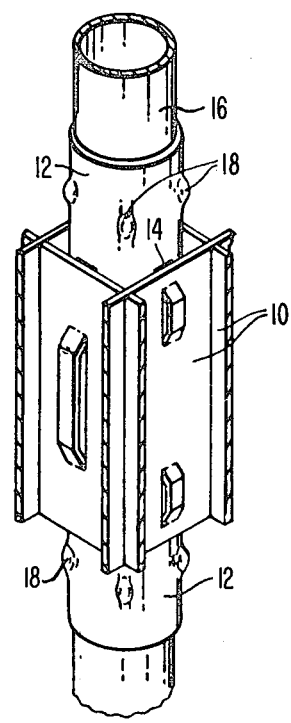
FIG. 1 is a perspective view of a portion of a fuel assembly grid, including a sleeve and control rod guide tube therein, and illustrating how outwardly directed bulges in guide tube serves to lock the guide tube to the sleeve end grid.
Figure 2:
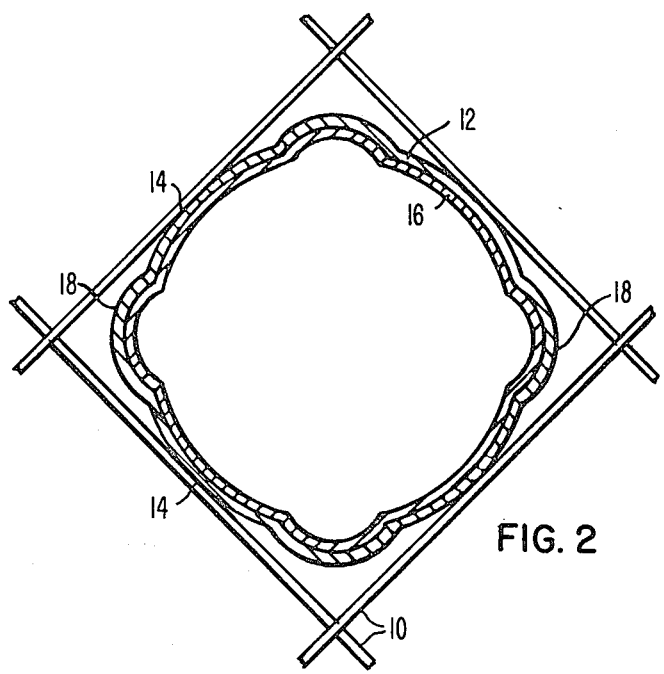
FIG. 2 is a plan view, partly in section, of the design illustrated in FIG. 1.

Referring now to the drawings wherein like reference characters designate like or corresponding parts throughout the several views, there is shown in FIGS. 1 and 2, a single control rod guide tube secured to interlocking straps of a fuel assembly grid. As shown, the grid straps 10 interlock to form a grid of egg-crate configuration and a sleeve 12 is brazed at 14 or otherwise affixed to grid straps 10. To accommodate axial movement of control rods in the fuel assembly, a plurality of control rod guide tubes 16 are fitted in their corresponding sleeves and are mechanically secured thereto by bulges 18 formed in the material of the control rod guide tube 16.

Figure 3:
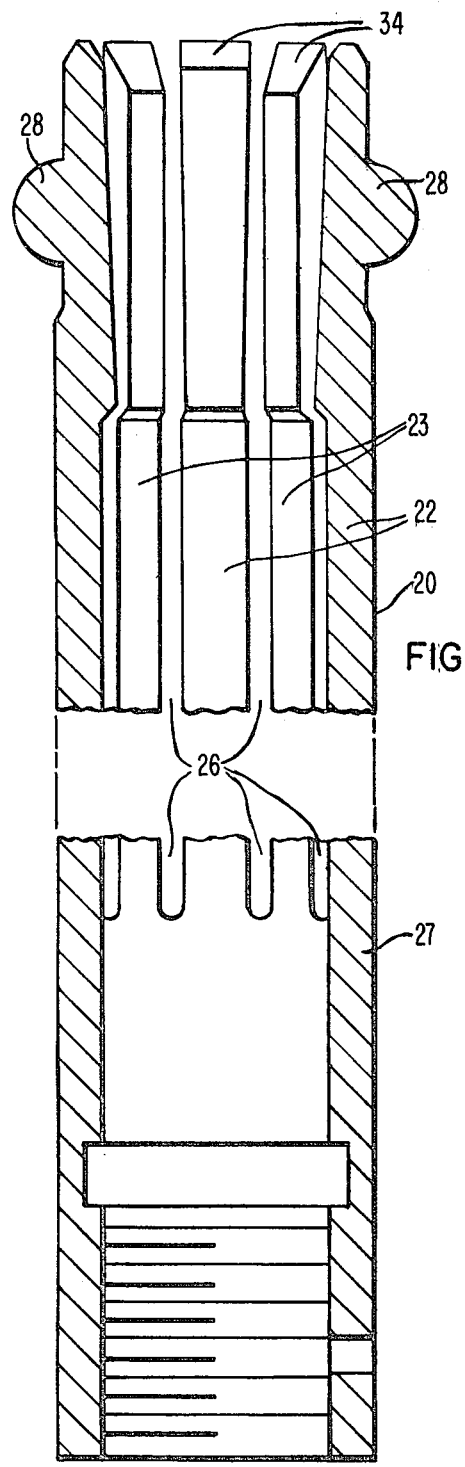
FIG. 3 is a sectional view in elevation taken on lines 3—3 of FIG. 4 showing the arrangement of tines or ligaments formed on an end of the cluster portion of a bulge tool.
Figure 5:
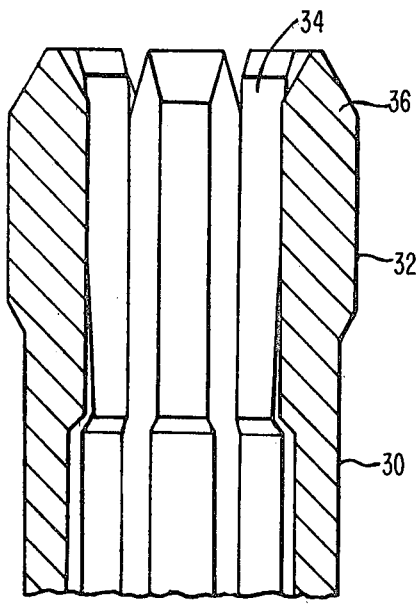
FIG. 5 is a view taken on lines 5—5 of FIG. 4.
Figure 6:
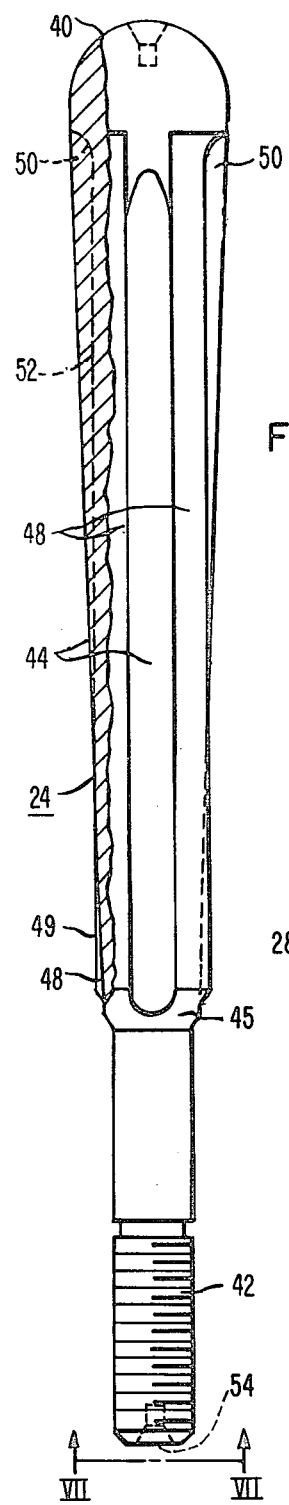
FIG. 6 is a view in elevation, partly in section, illustrating the design of a ram which is used for spreading the tines of FIG. 3 outwardly during the time the bulge tool is in use.
Figure 7:
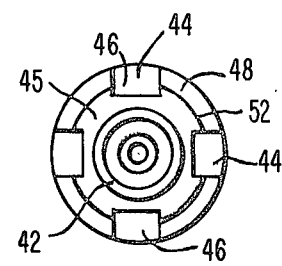
FIG. 7 is an end view of the ram illustrated in FIG. 6.
Figure 8:
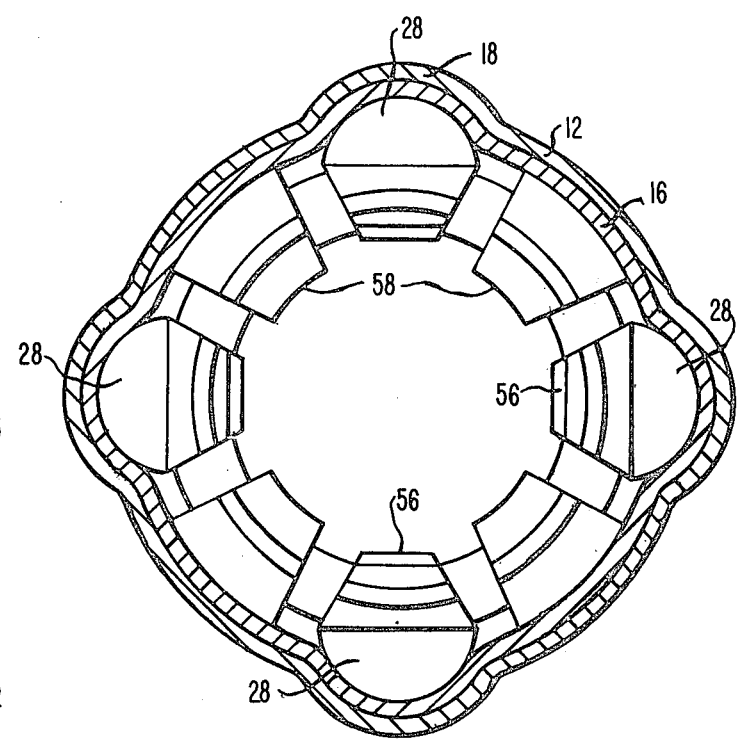
FIG. 8 illustrates how the bulge tool of this invention controls the shrinkage of guide-tool material during the time bulges are formed in the guide tube.

The bulge tool design used in creating the bulges is illustrated in FIGS. 3-7. Referring to FIG. 3, the cluster portion 20 of the bulge tool is hollow, and includes bulge tines 22 and support tines 23 which are moved radially outwardly when ram 24 of FIG. 6 is inserted therein and axially pulled in the tine expansion direction. The cluster portion 20 of the tool measures about 7.50 inches long with slots 26 extending in about two-thirds of the cluster length to provide a number of tines or ligaments. In the preferred embodiment, eight tines are formed with a slot space between adjacent tines of about 0.080 inch, with each tine having a wall thickness of 0.250 inches, thus imparting sufficient flexibility to the tines to easily permit radially outward movement and still not be so rigid as to work-harden the material as a result of continual flexing.

The outer surface of each alternating bulge tine 22 has a projection 28 integrally formed thereon while the ends of the intermediate support tines 30 have a built-up portion 32, FIG. 5, for a purpose more fully described hereafter. The inner and outer end surfaces 34, 36 are formed at about 60° angles with the barrel axis, thus leaving a flat portion 38 in the end thereof. This permits easy insertion of the ram in the cluster of the tool and the complete tool into the end of a control rod guide tube.

As illustrated in FIG. 6, the ram 24 is of extended teardrop shape having one end 40 formed to the configuration of a sphere and having a diameter of 0.750 inch which is formed on a 0.375 inch radius. The other end of a ram terminates in an exteriorly thread stud 42. The ram is equipped with eight surfaces all made of a size and shape to mate with the inner surfaces on the eight tines in the cluster portion of the tool. The outer surface of the ram has four alternate spaced surfaces 44 machined flat which taper uniformly at a 2° angle from the spherical end to a point about two-thirds of its length where the taper merges into a base 45 spaced slightly from the threaded end 42. These four flat but tapered surfaces merge directly into the rounded surface of the spherical end, with the flat surface ending at just about where the sphere starts to form. The other end of the flat surface starts forming a groove 46 about one-inch in from the base, but it still retains its flat contour. This is observable from the end view shown in FIG. 7, wherein the groove end is shown as a line in the base. It is important to note that this flat surface 44 rises along the ram length until it smoothly merges into the spherical end 40.

These flat surfaces 44 are separated circumferentially by grooves 48 machined into the ram surface through a major portion of the ram length. These grooves likewise extend substantially the full length of the ram body. Each of the four grooves terminate at one end at a point just about where the roundness starts to appear on the spherical end. Since the groove lies inwardly from the flat surfaces 44 on opposite sides thereof, the groove end which merges into the spherical end is provided with a .19 inch maximum tool or runout 50 for a purpose hereafter described. It will be observed from FIGS. 6 and 7 that the bottom 52 of each groove 48 has a rounded surface and, as particularly noted in FIG. 6, the bottom 52 of the grooves 48 are of uniform or the same diameter throughout the ram length. Because of this, the bottom of the groove merges into a section 49 which appears to project outwardly, but does not, because of the uniform diameter throughout the ram length.

The ram end 42 also includes a threaded opening 54 in its outer end. A ram puller, not shown, is adapted to be screwed into the threaded opening and is used to pull the ram into the cluster portion of the tool to thereby create bulges in the sleeves and control rod guide tubes, as discussed above.

Figure 4:
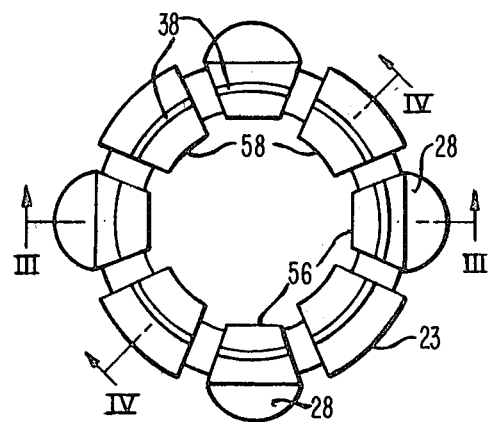
FIG. 4 is an end view of a bulge tool shown in FIG. 3.

Referring to FIGS. 4 and 5, it will be seen that the inner surface 56 of bulge tines 22 having the projections 28 thereon, are machined flat in the region of the bulge. These flat surfaces 56 are substantially of the same width as the flat surfaces 44 on the ram and engage each other when the ram is pulled to the bulge forming position. Likewise, the support tines 23 on the cluster portion of the tool are equipped with a rounded or curved surface 58 complementary to the rounded surfaces 48 machined in the ram. These flat and rounded complementary surfaces on the tines and ram each perform separate functions.

The unit is assembled by loosely positioning the threaded end of the ram in the tine end of the cluster portion of the tool, and then orienting the ram therein in a direction such that the complementary surfaces on the ram and the inner surfaces of the times engage each other. The rounded and flat surfaces of the ram are adapted respectively to ride on their mating surfaces on the tines as the ram is pulled into the cluster by a ram puller attached to the threaded end 54 of the ram. When the tool is initially inserted on an end of a guide tube, the bulge tines having projections 28 thereon, are easily depressed onto the cylindrical surface 60 formed on the threaded end of the ram. Space is available for this purpose because the 2° taper commences at that end of the ram. The outer surface of support tines 23 can also be depressed into cylindrical surface 60. This is to allow sufficient clearances between the tool and guide tube to allow free axial motion in positioning the tool. However, during the bulging operation the outer surface of support tines 23 fit snugly into the inner surface of the guide tube. The reason for such snugness is that the curved inner surface of the tines 23 engage the correspondingly curved surfaces on the ram, and the distances are chosen such that when these surfaces are in engagement, the cluster end of the tool will just fit into the inside diameter of a guide tube. Since the curved surfaces 48 on the ram preferably do not rise or fall throughout the ram length, as the ram is pulled into tool cluster, the outer surface of support tines 23 will always engage the inner surface of the guide tube. The feature constitutes an important part of the invention because as bulges are made in the sleeve and guide tube, the material between bulges will tend to shrink in a direction toward the guide tube axis, and if this happens, the guide tube inner diameter will decrease enough to later preclude linear movement of a control rod therein. The function of support tines 23 therefore is to hold and support such material against the forces which cause material shrinkage or drawing in toward the guide tube axis when bulges are being created therein.

The tool is then further moved into the guide tube until the projections 28 fall just beyond a grid strap but still within the axial position of the sleeve. With the tool thus set in a precise position, the ram is mechanically pulled into the cluster. In so doing, the flat surfaces 44 on the ram slide on the complementary flat surfaces 56 on tines 22. Since the ram flat surfaces 44 are machined to a 2° taper, the ram causes tines 22 and projections 28 thereon to move radially outward into contact with the sleeve, and further ram movement thereupon causes the bulges to take place, while still maintaining the original diameter of the guide tube.

After the bulges are made, the ram is withdrawn thus permitting the projections 28 to move out of the bulge area and thereby allow complete withdrawal of the tool from the guide tube.

In the preferred form of the invention disclosed herein, the use of eight tines allows four tines for bulge creation purposes while the remaining four tines serve a material support function. It will occur to those skilled in the art that any number of bulge and support tines may be used consistent with the particular design of product being deformed with bulges, irrespective of whether it is round, square or of other configuration. Also, it will be evident that the configuration of the ram and tine complementary surfaces could just as well be reversed. The tapered and/or curved surfaces on the ram could be located on the tines, and the corresponding surfaces on the tines could be located on the ram.

In the preferred embodiment disclosed above, the bulge has been made in both the sleeve and guide tube. However, it will be evident that the bulge could be made beyond the sleeve, thus leaving the sleeve intact and not subject to the forces of distortion. Also, it is equally evident the sleeve may be omitted completely and the bulge made in the guide tube on opposite sides of the grid. In this latter case, the bulges would extend over the grid strap edges and thus effectively mechanically lock the grid to the guide tubes.

It therefore will be apparent that many modifications and variations are possible in light of the above teachings. It therefore is to be understood that within the scope of the appended claims, the invention may be practiced other than as specifically disclosed.

What is claimed is:

1. The method of securing a nuclear reactor fuel assembly grid to control rod guide tubes extending therethrough comprising the steps of:
   immovably fixing a short sleeve in selected cells in said grid;
   pulling a control rod guide through each of said sleeves;
   inserting a bulge tool in said guide tube, the end of said tool being positioned near the end of said sleeve on one side of said grid;
   said tool including a housing having flexible tines thereon and outwardly extending projections on certain of said tines;
   pulling a ram having surfaces complementary to the inner surfaces of said tines, into said housing;
   causing said projections to move radially outward into contact with the inner surface of the guide tube;
   continuing the pulling of said ram and causing said projections to create an outward bulge in said guide tube; and
   moving said bulge tool in the guide tube to a position on the other side of said grid, and repeating the above process of creating a bulge in the guide tube to thereby mechanically secure said grid to the control rod guide tubes.

2. The method according to claim 1 including the step of causing support tines located between the projection tines to maintain their initial position with respect to the inner surface of said guide tube during the time a bulge is being made in the guide tube material to preclude shrinkage of the tube material between bulges when the bulges are formed in said tube.

3. The method according to claim 1 including the steps of causing circumferentially spaced flat tapered surfaces on said ram to engage complementary flat surfaces on the inner side of alternately spaced tines having projections thereon; and
   causing circumferentially spaced curves surfaces on said ram to engage complementary surfaces on support tines located between said projection tines when the ram is pulled into said housing to maintain their initial radial position and thereby preclude the guide tube from decreasing in diameter when said bulges are made in the guide tube material.

\* \* \* \* \*